(12) United States Patent
Machida et al.

(10) Patent No.: US 10,671,959 B2
(45) Date of Patent: Jun. 2, 2020

(54) INFORMATION PROCESSING SYSTEM, INFORMATION PROCESSING METHOD, AND NON-TRANSITORY COMPUTER READABLE STORAGE MEDIUM

(71) Applicant: CANON KABUSHIKI KAISHA, Tokyo (JP)

(72) Inventors: Megumi Machida, Tokyo (JP); Erina Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 15/406,285

(22) Filed: Jan. 13, 2017

(65) Prior Publication Data

US 2017/0213182 A1  Jul. 27, 2017

(30) Foreign Application Priority Data

Jan. 26, 2016  (JP) .................................. 2016-012850

(51) Int. Cl.
*G06Q 30/00* (2012.01)
*G06Q 10/08* (2012.01)
*G06Q 30/06* (2012.01)

(52) U.S. Cl.
CPC ....... *G06Q 10/083* (2013.01); *G06Q 30/0621* (2013.01); *G06Q 30/0633* (2013.01)

(58) Field of Classification Search
CPC .... G06F 3/1219; G06F 3/1288; G06F 3/1274; G06F 3/1273
USPC .................................................... 705/26, 27
See application file for complete search history.

(56) References Cited

U.S. PATENT DOCUMENTS

| 8,503,015 B2 * | 8/2013 | Gustafson | G06Q 10/06 358/1.15 |
| 2008/0129034 A1 * | 6/2008 | Anderson | B42D 1/08 283/67 |
| 2010/0195155 A1 * | 8/2010 | Gustafson | G06Q 10/06 358/1.15 |

FOREIGN PATENT DOCUMENTS

| JP | 2003-108477 A | 4/2003 |
| JP | 2004-266456 A | 9/2004 |
| JP | 2006-227839 A | 8/2006 |
| JP | 2011-071851 A | 4/2011 |
| JP | 2014-182603 A | 9/2014 |

OTHER PUBLICATIONS

Agrawal et al., "Simultaneous Task Scheduling and Resource Binding for Digital Print Automation," IIE Annual Conference. Proceedings: 1-8. Institute of Industrial and Systems Engineers (IISE). (2011); Dialog #1190330269, 12pgs. (Year: 2011).*
Office Action issued in corresponding Japanese Application No. 2016012850, dated Dec. 9, 2019.

* cited by examiner

*Primary Examiner* — Robert M Pond
(74) *Attorney, Agent, or Firm* — Venable LLP

(57) ABSTRACT

Assume that a first step in a series of processing is completed while data used in the series of processing is stored in a first directory in a first unit. In this case, the data is stored in a second directory different from the first directory in a second unit corresponding to a second step as a next step of the first step.

20 Claims, 11 Drawing Sheets

FIG. 4

| DIRECTORY | | STATUS | ACCESS CONTROL (PERMISSION) | DATA HOLDING PERIOD |
|---|---|---|---|---|
| 421 — UPLOAD | ST1 — | UPLOAD COMPLETION | EDITING/ORDER APPLICATION | 7 DAYS |
| 422 — ORDER COMPLETION | ST2 — ST3 — | PROVISIONAL ORDER ACCEPTANCE COMPLETION, ORDER ACCEPTANCE COMPLETION | INSIDE MANAGEMENT SYSTEM | INDEFINITE |
| 423 — DOWNLOAD | ST4 — ST5 — | WAITING FOR DOWNLOAD, DOWNLOAD COMPLETION | LABORATORY MANAGEMENT APPLICATION | INDEFINITE |
| 424 — SHIPMENT COMPLETION | ST6 — | SHIPMENT COMPLETION | LABORATORY MANAGEMENT APPLICATION | 30 DAYS |

FIG. 5

| STATUS | DATA UNIT | DATA FORMAT | COOPERATION DESTINATION |
|---|---|---|---|
| ST1 — UPLOAD COMPLETION | ALBUM | ALBUM 1 \| ALBUM 2 \| ALBUM 3 \| ALBUM 4 | EDITING/ORDER APPLICATION |
| ST2 — PROVISIONAL ORDER ACCEPTANCE COMPLETION, ST3 — ORDER ACCEPTANCE COMPLETION | ORDER | ORDER 1: ALBUM 1 / DELIVERY DESTINATION 1, ALBUM 2 / DELIVERY DESTINATION 2, ALBUM 3 / DELIVERY DESTINATION 1 ; ORDER 2: ALBUM 4 / DELIVERY DESTINATION 2 | INSIDE MANAGEMENT SYSTEM |
| ST4 — WAITING FOR DOWNLOAD, ST5 — DOWNLOAD COMPLETION, ST6 — SHIPMENT COMPLETION | ORDER FOR EACH LABORATORY | ORDER 1: LABORATORY 1 — ALBUM 1 / DELIVERY DESTINATION 1, ALBUM 2 / DELIVERY DESTINATION 2 ; LABORATORY 2 — ALBUM 3 / DELIVERY DESTINATION 1 ; ORDER 2: LABORATORY 1 — ALBUM 4 / DELIVERY DESTINATION 2 | LABORATORY MANAGEMENT APPLICATION |

INFORMATION PROCESSING SYSTEM, INFORMATION PROCESSING METHOD, AND NON-TRANSITORY COMPUTER READABLE STORAGE MEDIUM

BACKGROUND OF THE INVENTION

Field of the Invention

The present invention relates to a data management technique.

Description of the Related Art

In recent years, services (online shopping) for accepting an order of a product via an online store on a Web site, and delivering an actual product have extensively been provided. In online shopping, some services sell ready-made products in online stores but some services deal with products according to user's desire or so-called made-to-order products. For example, there is provided a photo book generation service with which the user selects an album template prepared in advance, and uploads captured photos, thereby generating an original photo album for the user and delivering it.

When dealing with such made-to-order product, various systems need to cooperate with each other in a sequence of accepting order data from the user, performing settlement processing, generating a product in accordance with order contents, and delivering the product. Since there is a difference in method of processing order data between the respective systems, it is required to perform appropriate data management in accordance with each status from an order acceptance status to a delivery status.

Japanese Patent Laid-Open No. 2014-182603 discloses a mechanism of dividing a saving area in accordance with the approval status of document data.

As described above, the photo book generation service is formed by a plurality of systems to implement a sequence from generation of a photo book to delivery of it. More specifically, there are a system for editing and ordering a photo book, a system for managing an order and settlement, a system for managing printing and delivery of the photo book, and a management system for mediating between the systems.

As described above, for example, in the photo book generation service, systems to cooperate with each other are different in each status, and thus an appropriate data unit when data are managed by a cooperation destination system may be different depending on the cooperation destination system.

SUMMARY OF THE INVENTION

The present invention has been made in consideration of the above problem, and provides a technique for managing data in a unit appropriate for each step of data processing.

According to one aspect of the present invention, there is provided an information processing system comprising: a storage control unit configured to store, upon completion of a first step in a series of processing while data used in the series of processing is stored in a first directory in a first unit, the data in a second directory different from the first directory in a second unit corresponding to a second step as a next step of the first step.

According to another aspect of the present invention, there is provided an information processing method comprising: storing, upon completion of a first step in a series of processing while data used in the series of processing is stored in a first directory in a first unit, the data in a second directory different from the first directory in a second unit corresponding to a second step as a next step of the first step.

According to still another aspect of the present invention, there is provided a non-transitory computer readable storage medium storing a computer program for causing a computer to function as a storage control unit configured to store, upon completion of a first step in a series of processing while data used in the series of processing is stored in a first directory in a first unit, the data in a second directory different from the first directory in a second unit corresponding to a second step as a next step of the first step.

Further features of the present invention will become apparent from the following description of exemplary embodiments (with reference to the attached drawings).

BRIEF DESCRIPTION OF THE DRAWINGS

FIG. 4 is a table for explaining respective directories;

FIG. 5 is a view for explaining the relationship between a directory, a storage data unit, and a status;

DESCRIPTION OF THE EMBODIMENTS

The embodiments of the present invention will be described below with reference to the accompanying drawings. Note that the embodiments to be described below are examples of detailed implementation of the present invention or detailed examples of the arrangement described in the appended claims.

First Embodiment

Figure 1:
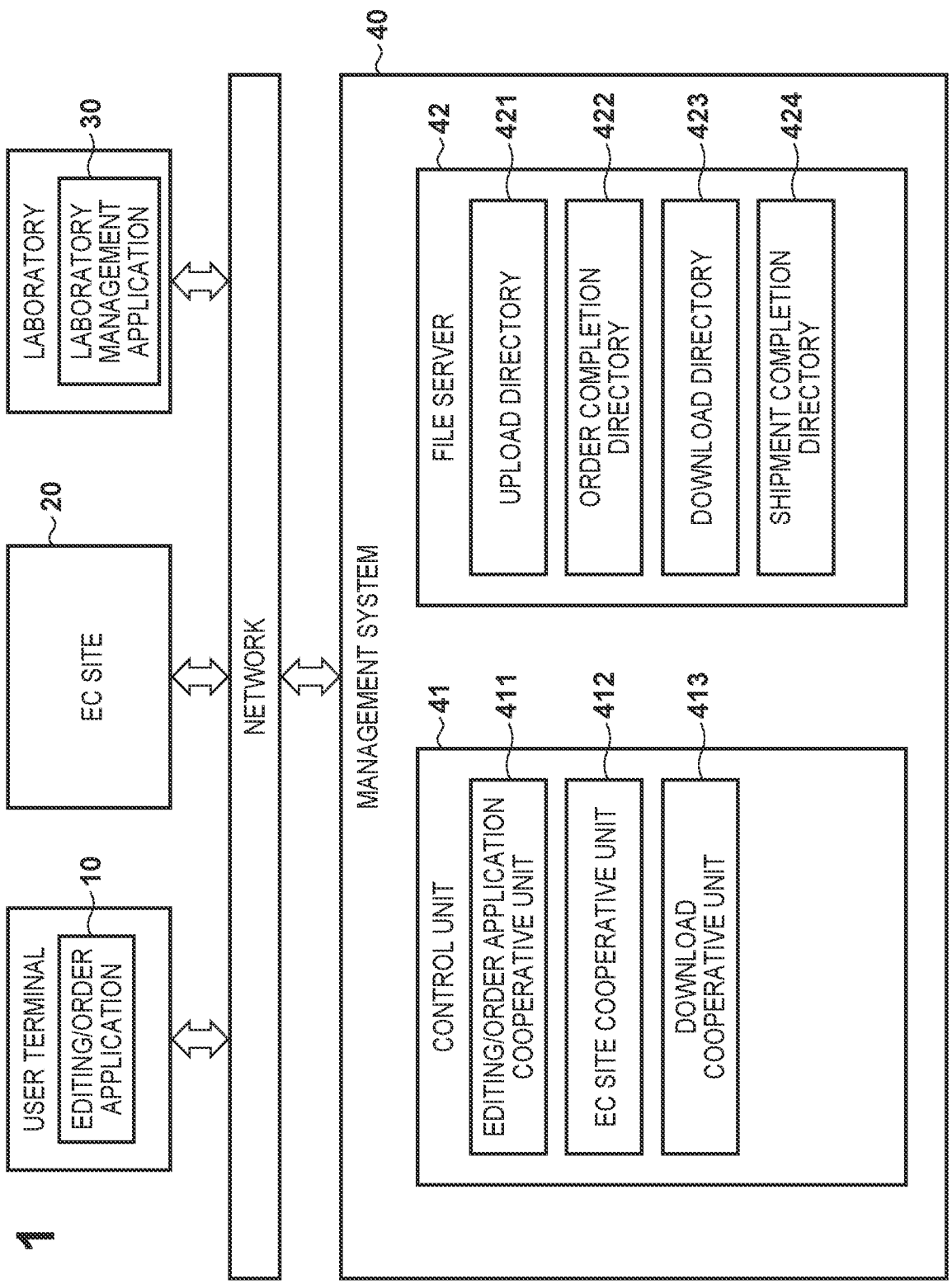
FIG. 1 is a block diagram showing an example of the arrangement of a system.

In this embodiment, a system for providing a photo book (album) generation service will be described. An example of the arrangement of a system for providing a photo book generation service will be described first with reference to a block diagram shown in FIG. 1. The system shown in FIG. 1 is formed by a plurality of devices for implementing a series of sequences of, upon receiving a generation request of a photo book from the user, generating the photo book based on the generation request, and shipping the generated photo book to a shipment destination according to the generation request.

A user terminal is a device operated by the user to generate a photo book and issue a generation request, and is formed by a device such as a PC (Personal Computer), a smartphone, or a tablet terminal device. In this user terminal, an editing/order application 10 is installed as application software for generating a photo book and issuing a generation request.

An EC site 20 is a system for managing settlement for a photo book for which a generation request has been issued by the user terminal, and may be formed by a single device or a plurality of devices.

A laboratory is a system for generating and shipping a photo book for which a generation request has been issued, and is formed by a single device or a plurality of devices. In the laboratory, a laboratory management application 30 is installed as application software for managing generation and shipment of the photo book for which the generation request has been issued.

All of the above user terminal, EC site 20, and laboratory are connected to a network such as the Internet. Note that FIG. 1 shows one user terminal, one EC site 20, and one laboratory but a plurality of user terminals, a plurality of EC sites 20, and a plurality of laboratories may be included.

A management system 40 is an example of an information processing system which manages a generation request from the user terminal, and supports generation and shipment of a photo book by mediating cooperation between the user terminal, the EC site 20, and the laboratory, and is formed by a single device or a plurality of devices. The management system 40 includes a control unit 41 and a file server 42.

The control unit 41 will be described first. The control unit 41 includes an editing/order application cooperative unit 411, an EC site cooperative unit 412, and a download cooperative unit 413. The editing/order application cooperative unit 411 performs data processing related to the user terminal. The EC site cooperative unit 412 performs data processing related to the EC site 20. The download cooperative unit 413 performs data processing related to the laboratory.

The file server 42 will be described next. The file server 42 has a plurality of directories to manage the data (order data) of the generation request of a photo book received from the user terminal in accordance with the degree of progress of generation of the photo book. The plurality of directories include an upload directory 421, an order completion directory 422, a download directory 423, and a shipment completion directory 424.

Note that FIG. 1 shows the control unit 41 and the file server 42 as separate devices. However, the control unit 41 and the file server 42 may be formed by one device. The management system 40 is also connected to the above network.

Figure 2:
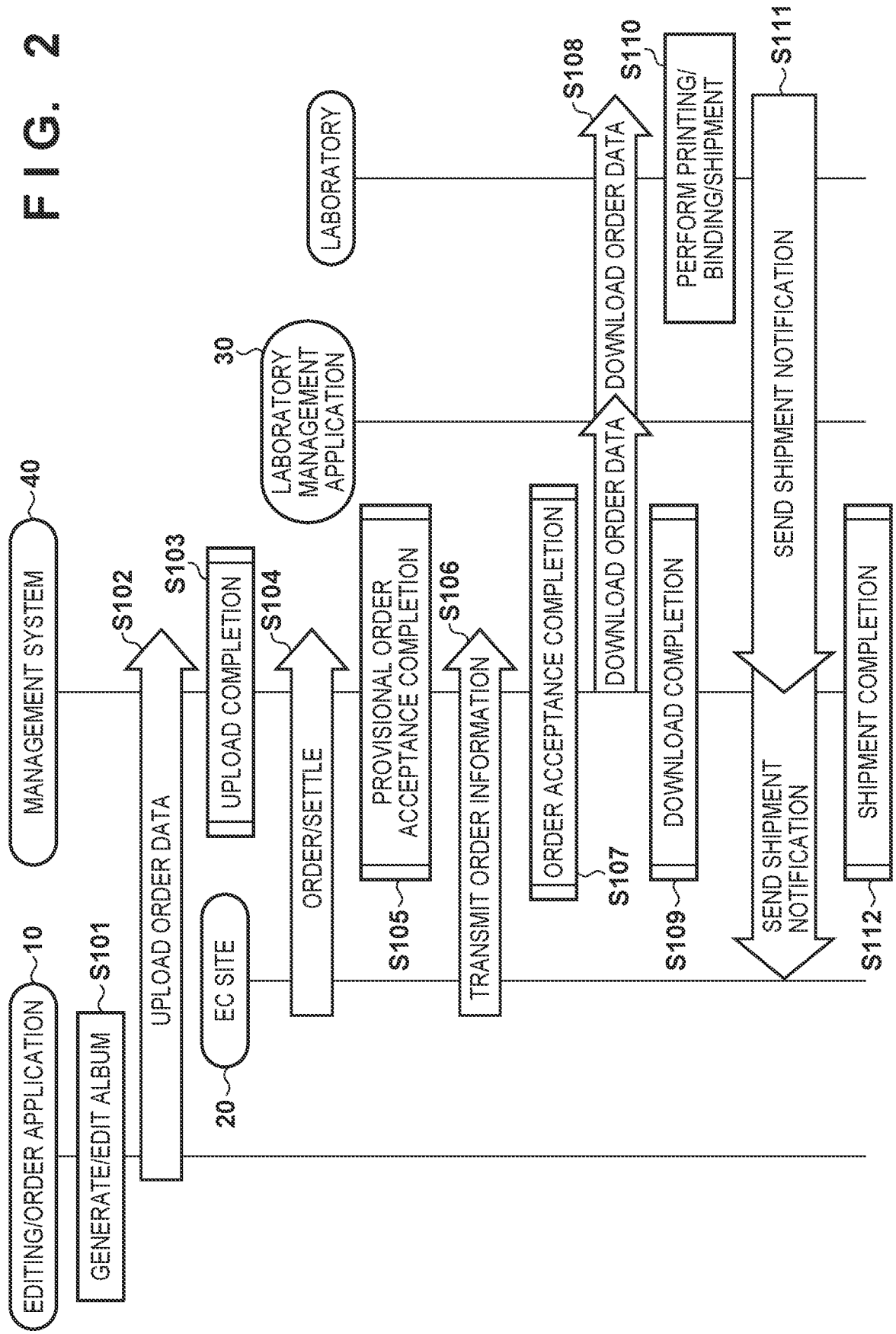
FIG. 2 is a sequence chart showing an outline of the operation of the system.

An outline of the operation of the system shown in FIG. 1 will be described with reference to a sequence chart shown in FIG. 2. FIG. 2 shows the operations of the user terminal (editing/order application 10), the EC site 20, the management system 40, the laboratory, and the laboratory management application 30 in a series of sequences from generation of a photo book based on a generation request from the user terminal to shipment of the photo book. Note that the application software may be described as the main body of processing. In fact, however, a corresponding function is implemented when the processor of a device in which the application software is installed executes the application software.

<S101>

The editing/order application 10 generates or edits a photo book in accordance with a user operation on the user terminal. For example, the editing/order application 10 displays, on the display screen of the user terminal, a list of a plurality of templates each indicating the arrangement pattern of images to be laid out on a page of the photo book, and accepts a selection operation by the user. Furthermore, the editing/order application 10 displays, on the display screen of the user terminal, a list of candidates of images to be laid out on a page of the photo book, and accepts a selection operation by the user. The editing/order application 10 lays out images selected by the user on a temperate selected by the user, thereby generating a page of the photo book. As described above, the editing/order application 10 provides various functions for the user to generate a page of the photo book.

<S102>

When the user inputs an instruction indicating photo book generation completion using the user terminal, the editing/order application 10 transmits (uploads), as order data, the data of the photo book generated by the user to the management system 40. This data includes various data necessary for the generation request of the photo book, such as the data of the template and the data of the images to be laid out on the template.

The management system 40 (editing/order application cooperative unit 411) stores, in the upload directory 421, the order data uploaded from the user terminal. The upload directory 421 is a directory which can be accessed by only the user terminal except for the management system 40, and is set not to be accessed from the remaining devices such as the EC site 20 and the laboratory.

<S103>

Upon receiving an upload completion notification of the order data from the editing/order application 10, the management system 40 (editing/order application cooperative unit 411) performs upload completion processing. The upload completion processing will be described later with reference to FIGS. 3A and 3B.

<S104>

When the user sends, to the EC site 20, a settlement instruction for the uploaded order data by operating the user terminal, the EC site 20 performs settlement processing for the order data. Note that the settlement instruction includes information (name, address, and the like) about the delivery destination of the photo book, information about the product (photo book), and order information including information (address, name, and the like) about an orderer. Upon completion of the settlement processing, the EC site 20 notifies the management system 40 of completion of the settlement processing.

<S105>

Upon receiving the notification indicating completion of the settlement processing from the EC site 20, the management system 40 (EC site cooperative unit 412) performs provisional order acceptance completion processing. The provisional order acceptance completion processing will be described later with reference to FIGS. 3A and 3B.

<S106>

The EC site 20 transmits, to the management system 40, the order information received from the user terminal in S104.

<S107>

Upon receiving the order information from the EC site 20, the management system 40 (EC site cooperative unit 412) performs order acceptance completion processing. The order acceptance completion processing will be described later with reference to FIGS. 3A and 3B.

<S108>

The laboratory (laboratory management application 30) downloads the order data and the order information from the management system 40. The following description assumes that "download of order data" includes download of corresponding order information, unless otherwise specified.

<S109>

Upon completion of download of the order data and the order information, the laboratory management application 30 transmits a download completion notification to the management system 40. Upon receiving the download completion notification from the laboratory management application 30, the management system 40 (download cooperative unit 413) executes download completion processing. The download completion processing will be described later with reference to FIGS. 3A and 3B.

<S110>

The laboratory performs printing processing and binding processing based on the downloaded order data, thereby generating the photo book (product). The laboratory performs processing for delivering the generated photo book to the delivery destination based on the order information.

<S111>

Upon completion of shipment of the photo book, the laboratory (laboratory management application 30) transmits a shipment completion notification to the management system 40. For example, upon completion of shipment of the photo book, the user inputs information about it to the laboratory. In response to this, the laboratory management application 30 transmits a shipment completion notification to the management system 40.

<S112>

Upon receiving the shipment completion notification transmitted from the laboratory management application 30, the management system 40 (download cooperative unit 413) performs shipment completion processing. The shipment completion processing will be described later with reference to FIGS. 3A and 3B.

The upload directory 421, the order completion directory 422, the download directory 423, and the shipment completion directory 424 will be described next with reference to FIG. 4.

The upload directory 421 is a directory for holding order data uploaded from the user terminal, and the status of the order data stored in the upload directory 421 is set to "upload completion" (ST1). Except for the management system 40, only the editing/order application 10 can access the upload directory 421, and the remaining devices (application software) cannot access it. The upload directory 421 can continuously hold the order data for seven days (data holding period) from the storage date/time. However, the order data which has been stored for a period longer than seven days from the storage date/time is deleted from the upload directory 421.

The order completion directory 422 is a directory for copying and holding order data for which settlement processing by the EC site 20 is complete, among the order data stored in the upload directory 421. The status of the order data copied from the upload directory 421 to the order completion directory 422 is set to "provisional order acceptance completion" (ST2). The status of order data whose order information (to be described later) has been received is set to "order acceptance completion" (ST3), and the order data is copied to the download directory 423. Only the management system 40 can access the order completion directory 422, and the remaining devices (application software) cannot access it. The data holding period of the order completion directory 422 is set to "indefinite", which indicates that the data holding period of the order completion directory 422 is not set.

The download directory 423 is a directory for holding order data whose order information has been received, as described above, and the status of the order data stored in the download directory 423 is set to "waiting for download" (ST4). The status of order data downloaded by the laboratory, among the order data stored in the download directory 423, is set to "download completion" (ST5). Except for the management system 40, only the laboratory management application 30 can access the download directory 423, and the remaining devices (application software) cannot access it. The data holding period of the download directory 423 is set to "indefinite", which indicates that the data holding period of the download directory 423 is not set. Note that as an assumption of an order, a plurality of albums can be ordered for each order and a delivery destination can be selected for each album.

The shipment completion directory 424 is a directory for copying, from the laboratory, the order data of the photo book which has been shipped, among the order data stored in the download directory 423, and holding it. The status of the order data stored in the shipment completion directory 424 is set to "shipment completion" (ST6). Except for the management system 40, only the laboratory management application 30 can access the shipment completion directory 424, and the remaining devices (application software) cannot access it. The shipment completion directory 424 can continuously hold the order data for 30 days (data holding period) from the storage date/time. However, the order data which has been stored for a period longer than 30 days from the storage date/time is deleted from the shipment completion directory 424.

Note that the data holding period of any of the directories may be preset or set by the user of the management system 40 by operating an operation unit (not shown). Note that the data holding periods shown in FIG. 4 are merely examples, and the present invention is not limited to them.

As described above, performing access control of each directory can prevent erroneous access from a device (application software) which is not in cooperation, thereby reducing information leakage and the like.

Figure 3A:
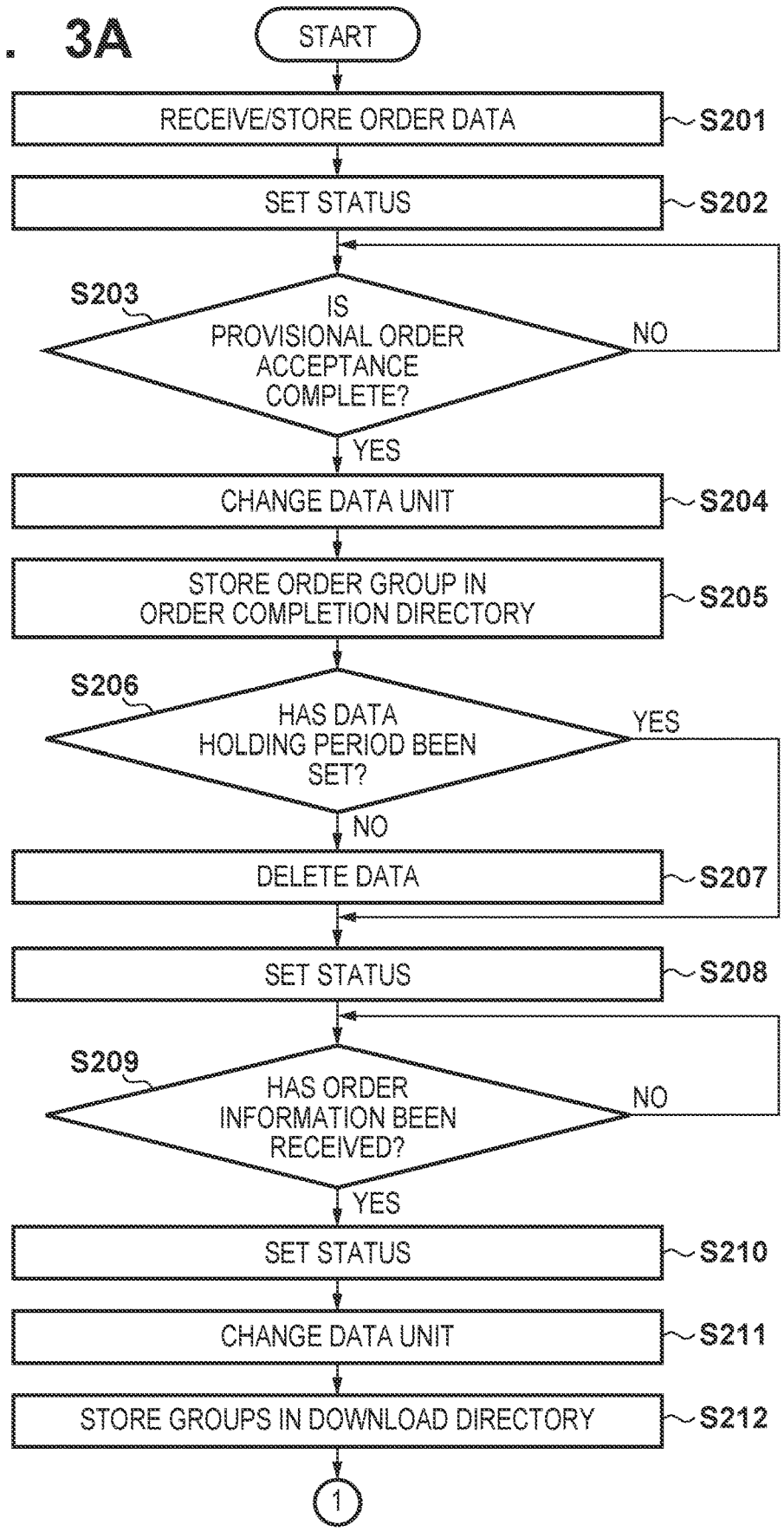
FIGS. 3A and 3B are flowcharts illustrating processing executed by a management system 40.
Figure 3B:
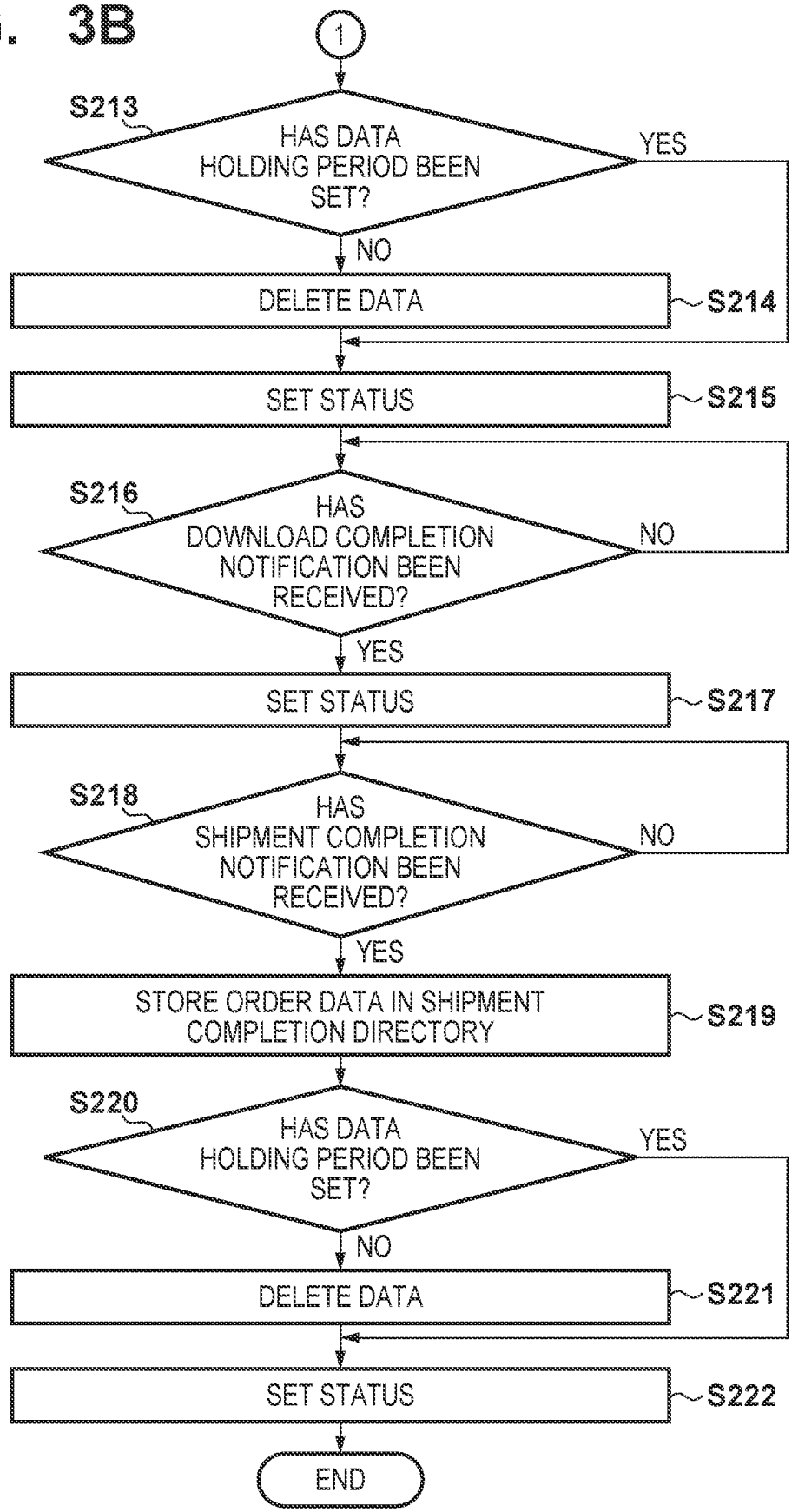

The processing executed by the management system 40 including the processes in S103, S105, S107, S109, and S112 will be described with reference to a flowchart shown in FIGS. 3A and 3B.

<S201>

Upon receiving order data from the user terminal, the editing/order application cooperative unit 411 stores the received order data in the upload directory 421. As a method of uploading order data from the user terminal, for example, the management system 40 transmits in advance the URL of the upload directory 421 to the user terminal. Then, the URL is designated to perform an upload operation on the user terminal side, thereby uploading the order data to the upload directory 421.

<S202>

The editing/order application cooperative unit 411 sets, to "upload completion" (ST1), the status of the order data stored in the upload directory 421 in S201. For example, upon completion of upload of the order data, the user terminal transmits an upload completion notification to the management system 40. Upon receiving the upload completion notification, the editing/order application cooperative unit 411 sets, to "upload completion" (ST1), the status of the order data stored in the upload directory 421 in S201.

The order data are stored in the upload directory 421 in a photo book (album) unit, as shown in FIG. 5, and the statuses of the order data stored in the upload directory 421 are set to "upload completion" (ST1). Referring to FIG. 5, the order data of four albums 1 to 4 are stored in the album unit. As described above, the upload directory 421 is a directory which can be accessed by only the editing/order application 10 except for the management system 40. Therefore, the editing/order application 10 can appropriately edit the order data uploaded to the upload directory 421.

<S203>

The EC site cooperative unit 412 determines whether settlement processing completion information (provisional order acceptance completion notification) has been received from the EC site 20. If it is determined that the information has been received, the process advances to S204; otherwise, the process stands by in S203.

<S204>

The "provisional order acceptance completion notification" received from the EC site 20 includes identifying information for identifying the order data for which the settlement processing has been performed. The identifying information is issued from the EC site 20 in a settlement unit. If settlement for an album X is completed, identifying information for identifying the album X is issued from the EC site 20. If a plurality of albums Y, Z, and W are collectively settled, pieces of identifying information for respectively identifying the albums Y, Z, and W are issued from the EC site 20. The EC site cooperative unit 412 puts the order data (group) indicated by the identifying information issued from the EC site 20 into one order group.

<S205>

The EC site cooperative unit 412 stores (copies) the order group from the upload directory 421 in the order completion directory 422. With this processing, the order data are managed in the settlement unit in the order completion directory 422.

<S206>

The editing/order application cooperative unit 411 determines whether the data holding period of the upload directory 421 has been set. If it is determined that the data holding period of the upload directory 421 has been set, the process advances to S208; otherwise, the process advances to S207. In the example of FIG. 4, a data holding period of "7 days" is set in the upload directory 421, and thus the process advances to S208.

<S207>

The editing/order application cooperative unit 411 deletes the order group as a copy source in the upload directory 421. Note that although not shown in FIGS. 3A and 3B, if the data holding period has been set, and the elapsed time after the storage date/time exceeds the data holding period, the editing/order application cooperative unit 411 performs the same deletion processing. This processing will be described later with reference to FIG. 6.

<S208>

The EC site cooperative unit 412 sets, to "provisional order acceptance completion" (ST2), the status of each piece of order data belonging to the order group stored in the order completion directory 422 in S205. The order data are stored in an order unit in the order completion directory 422, as shown in FIG. 5, and the status of each piece of order data stored in the order completion directory 422 is set to "provisional order acceptance completion" (ST2). Referring to FIG. 5, albums 1 to 3 are collectively settled, and album 4 is separately settled. Thus, management is performed by putting the order data of albums 1 to 3 into one order group (order 1), and putting the order data of album 4 into another order group (order 2). As described above, the order completion directory 422 is a directory which can be accessed by only the management system 40.

<S209>

The EC site cooperative unit 412 determines whether the order information has been received from the EC site 20. If it is determined that the information has been received, the process advances to S210; otherwise, the process stands by in S209. In the example of FIG. 5, as described above, albums 1 to 3 are put into an order group (order 1) and settled, and album 4 is put into another order group (order 2) and settled. Therefore, order information about order 1 and that about order 2 are received from the EC site 20. In the order information about order 1, delivery destination 1, delivery destination 2, and delivery destination 1 are respectively designated as the delivery destinations of albums 1 to 3. In the order information about order 2, delivery destination 2 is designated as the delivery destination of album 4.

<S210>

The EC site cooperative unit 412 sets, to "order acceptance completion" (ST3), the status of each piece of order data belonging to the order group whose order information has been received (accepted).

<S211>

The EC site cooperative unit 412 divides, for each order group, the order data belonging to the order group into groups each of which includes order data with the same order destination laboratory. The user of the user terminal can designate, in an order data unit, a laboratory to request generation of the photo book. When the user of the user terminal inputs an order data transmission instruction by designating a laboratory of a photo book request destination, the user terminal transmits, to the management system 40, the order data including information (laboratory information) for identifying the laboratory of the photo book request destination. Therefore, the EC site cooperative unit 412 divides the order data group belonging to the order group into groups each of which includes order data with the same laboratory information.

<S212>

The download cooperative unit 413 stores (copies), in the download directory 423, the groups divided in S211 (the original group which is not divided, if the group cannot be divided).

<S213>

The EC site cooperative unit 412 determines whether the data holding period of the order completion directory 422 has been set. If it is determined that the data holding period of the order completion directory 422 has been set, the process advances to S215; otherwise, the process advances to S214. In the example of FIG. 4, a data holding period of "indefinite" has been set in the order completion directory 422, and thus the process advances to S214.

<S214>

The EC site cooperative unit 412 deletes the order group as a copy source in the order completion directory 422. Note that although not shown in FIGS. 3A and 3B, if the data holding period has been set and the elapsed time after the storage date/time exceeds the data holding period, the EC site cooperative unit 412 performs the same deletion processing. This processing will be described later with reference to FIG. 6.

<S215>

The download cooperative unit 413 sets, to "waiting for download" (ST4), the status of each piece of order data belonging to the order group stored in the download directory 423 in S212.

Referring to FIG. 5, the order group of order 1 is divided into a group of the order data of albums 1 and 2 for which "laboratory 1" is designated as a photo book request destination and a group of the order data of album 3 for which "laboratory 2" is designated as a photo book request destination, and is then managed. Furthermore, since only one order data belongs the order group of order 2, no group division is performed, and the order group of order 2 is managed as a group of the order data of album 4 for which "laboratory 1" is designated as a photo book request destination.

<S216>

Figure 8:
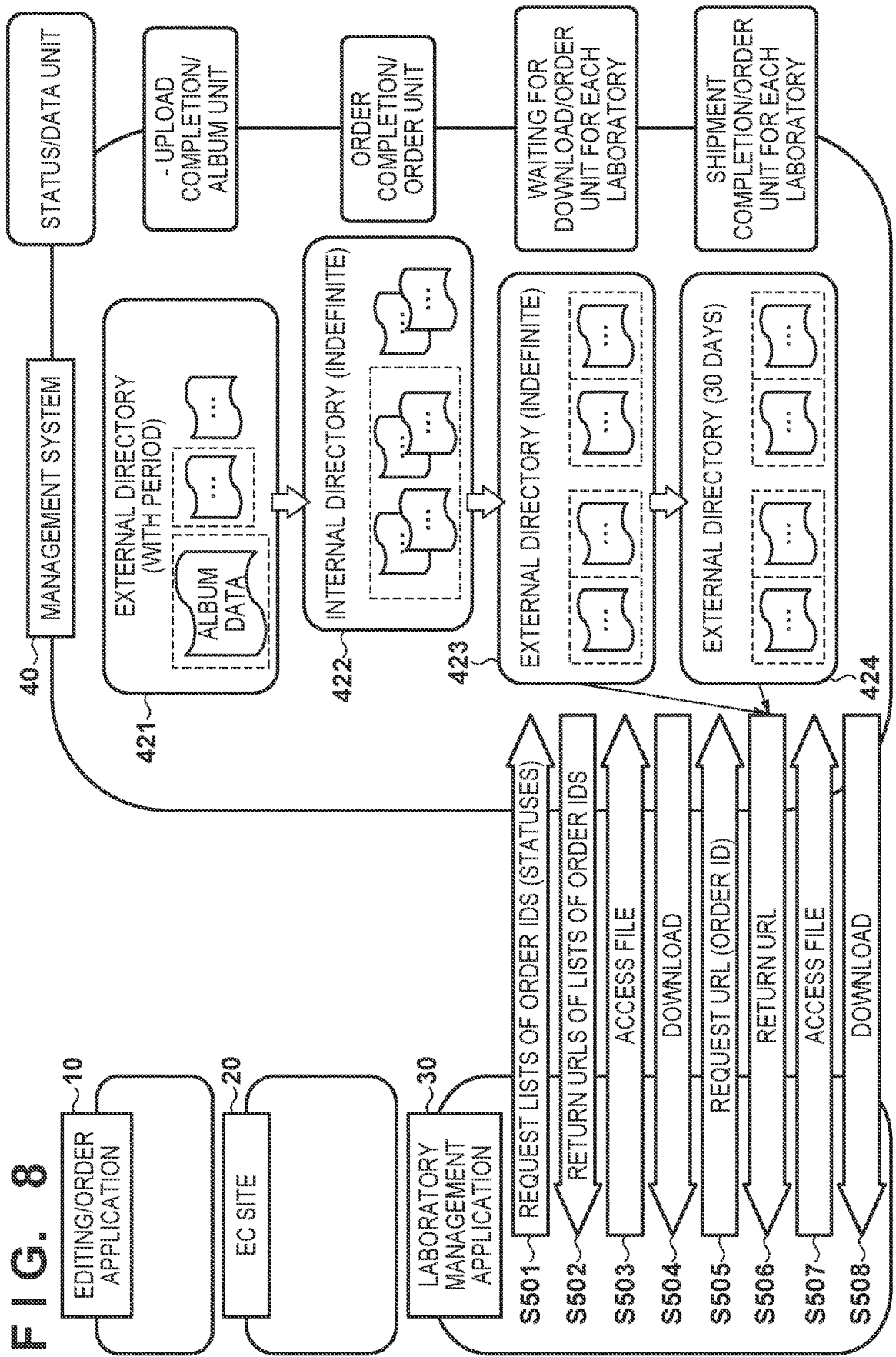
FIG. 8 is a flowchart illustrating an example of order data download processing.

The download cooperative unit 413 determines whether a download completion notification has been received from the laboratory. If it is determined that the download completion notification has been received, the process advances to S217; otherwise, the process stands by in S216. An example of processing of downloading order data, which is performed between the management system 40 and the laboratory, will be described with reference to a flowchart shown in FIG. 8.

<S501>

The laboratory management application 30 regularly or irregularly requests a list of pieces of identification information (order IDs) of order data whose statuses are "waiting for download", a list of the order IDs of order data whose statuses are "download completion", and a list of the order IDs of order data whose statuses are "shipment completion". The request destination is the management system 40.

<S502>

The control unit 41 transmits, to the laboratory management application 30, URLs indicating the storage destinations of the respective requested lists.

<S503>

If the user on the laboratory side designates one of the URLs transmitted from the management system 40, the laboratory management application 30 accesses the designated URL.

<S504>

The laboratory management application 30 downloads, from the management system 40, the list stored in the URL accessed in S503. Note that the order IDs and the list thereof may be stored in the management system 40 or stored in an external device accessible by the management system 40.

<S505>

The list downloaded in S504 is displayed on the display screen on the laboratory side. With reference to the list, the user designates order data to be downloaded. If the order to be downloaded is designated, the laboratory management application 30 requests the URL of the designated order data. The request destination is the management system 40.

<S506>

The control unit 41 transmits, to the laboratory management application 30, an URL indicating the storage destination of each piece of requested order data.

<S507>

If the user on the laboratory side designates one of the URLs transmitted from the management system 40, the laboratory management application 30 accesses the designated URL.

<S508>

The laboratory management application 30 downloads, from the management system 40, the order data stored in the URL accessed in S507. Upon completion of download, the laboratory management application 30 transmits a download completion notification to the management system 40.

Note that even after completion of download, it may be necessary to acquire the order data again due to a delivery failure from the laboratory to the user. In this case, the order data is downloaded again by re-executing the processes in S505 to S508. Note that if the order data designated by the laboratory management application 30 does not exist, the management system 40 returns an error without issuing an URL.

<S217>

The download cooperative unit 413 sets, to "download completion" (ST5), the status of the order data downloaded by the laboratory management application 30, among the order data held in the download directory 423.

<S218>

Figure 9:
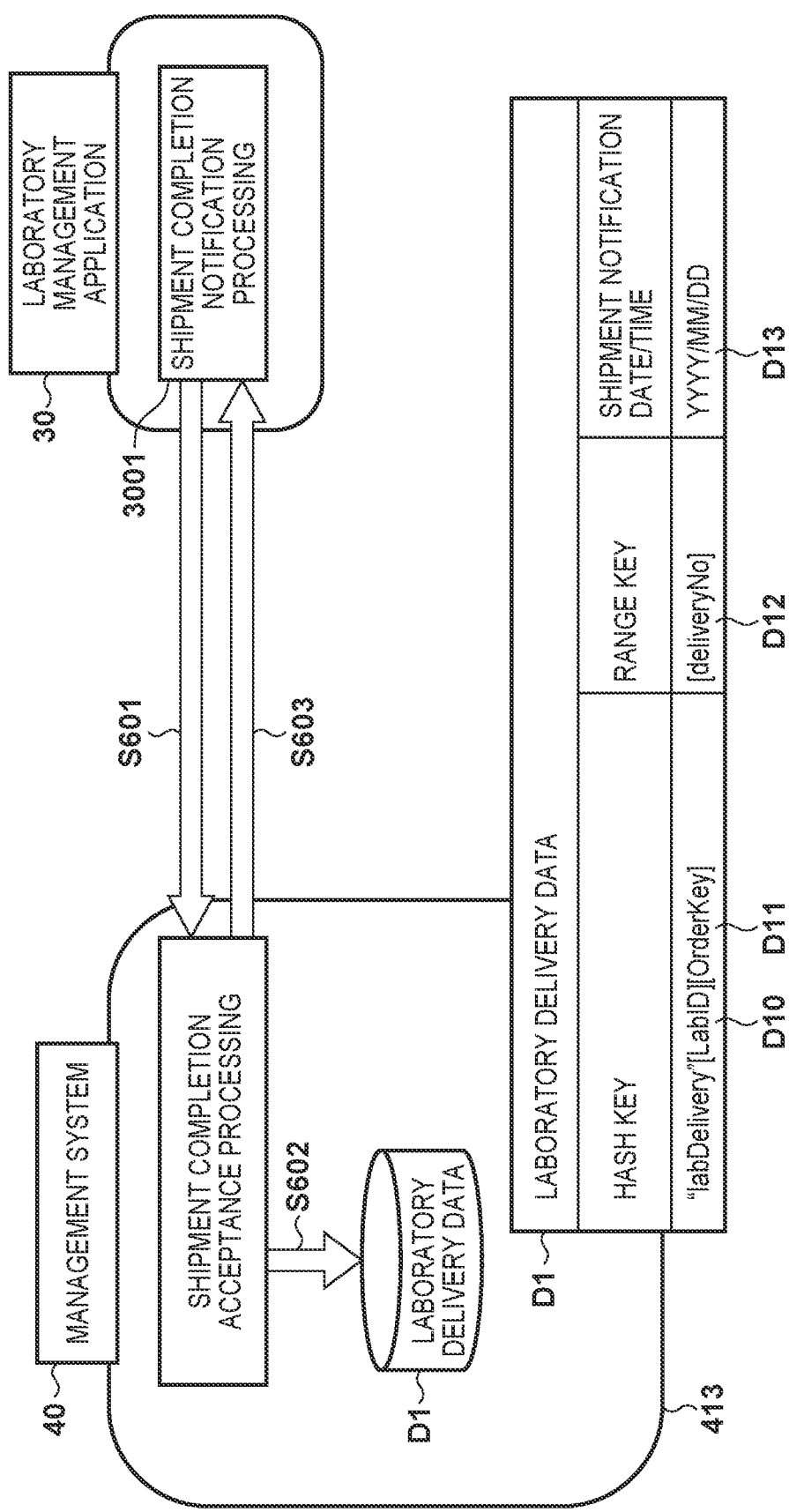
FIG. 9 is a view for explaining transmission of a shipment completion notification by a laboratory management application 30.

The download cooperative unit 413 determines whether a shipment completion notification has been received from the laboratory management application 30. If it is determined that the notification has been received, the process advances to S219; otherwise, the process stands by in S218. Transmission of the shipment completion notification by the laboratory management application 30 will be described with reference to FIG. 9.

<S601>

Upon completion of shipment of the photo book, the laboratory management application 30 transmits a shipment completion notification to the management system 40. This shipment completion notification includes information (laboratory ID) for identifying a shipment source (laboratory), information (for example, the order ID) for identifying the order data of the shipped photo book, and a delivery number.

<S602>

Upon receiving the shipment completion notification transmitted from the laboratory management application 30, the download cooperative unit 413 registers the shipment completion notification as laboratory delivery data Dl. The laboratory delivery data Dl includes, for example, a laboratory ID indicated by D10, an order ID indicated by D11, a delivery number indicated by D12, and a shipment completion date/time indicated by D13.

<S603>

Upon completion of the registration processing in S602, the download cooperative unit 413 notifies the laboratory management application 30 of completion of the shipment completion acceptance processing.

<S219>

The download cooperative unit 413 stores (copies), in the shipment completion directory 424, order data corresponding to the order ID included in the shipment completion notification, among the order data held in the download directory 423.

<S220>

The download cooperative unit 413 determines whether the data holding period of the download directory 423 has been set. If it is determined that the data holding period of the download directory 423 has been set, the process advances to S222; otherwise, the process advances to S221. In the example of FIG. 4, a data holding period of "indefinite" has been set in the download directory 423, and thus the process advances to S221.

<S221>

The download cooperative unit 413 deletes the order data as a copy source in the download directory 423. Note that although not shown in FIGS. 3A and 3B, if the data holding period has been set and the elapsed time after the storage date/time exceeds the data holding period, the download cooperative unit 413 performs the same deletion processing. This processing will be described later with reference to FIG. 6.

<S222>

The download cooperative unit 413 sets, to "shipment completion" (ST6), the status of each piece of order data stored in the shipment completion directory 424.

Figure 6:
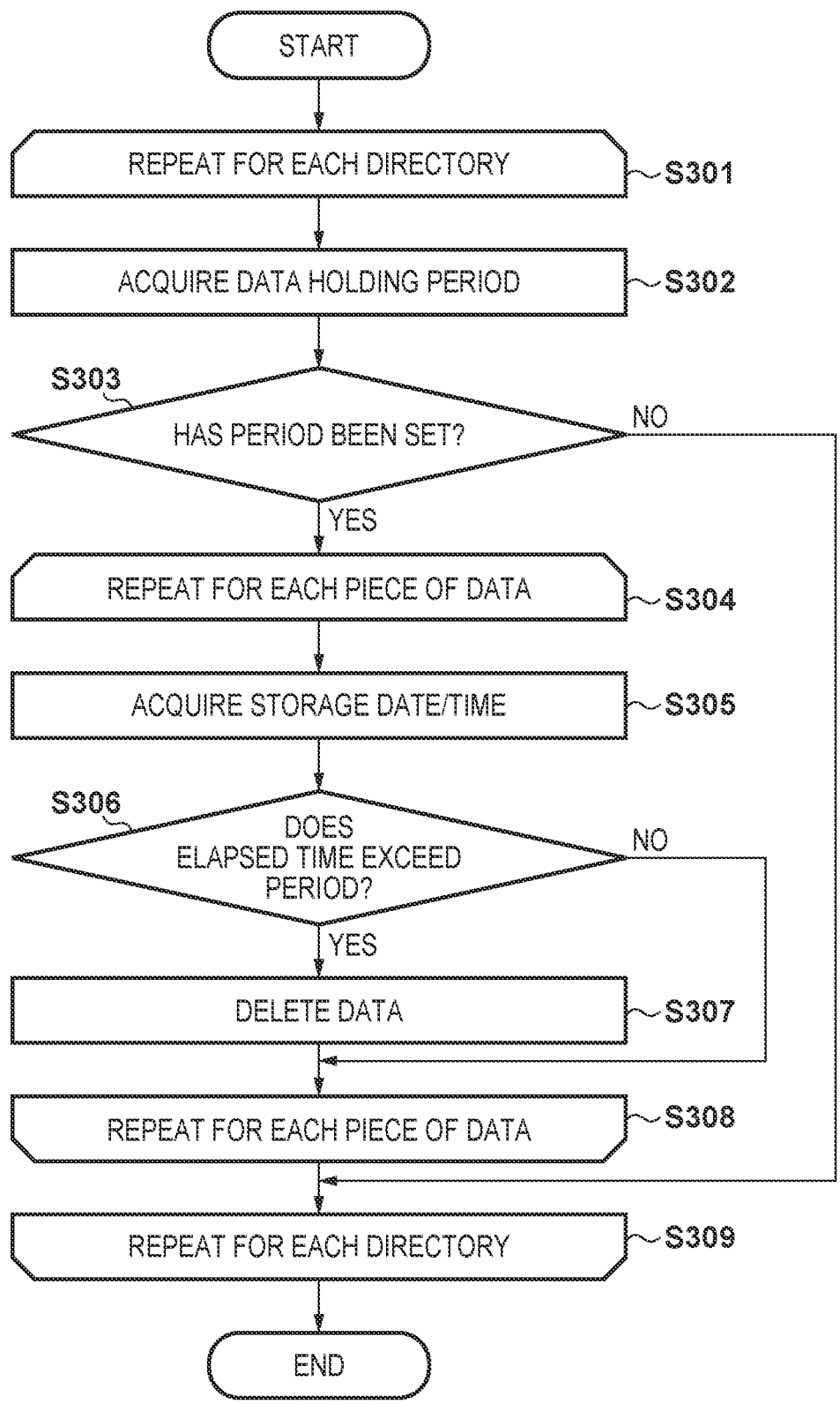
FIG. 6 is a flowchart illustrating deletion processing.

Processing of controlling, if the data holding period of the directory has been set, enable/disable of deletion of order data in accordance with whether the elapsed time after the storage date/time of the order data in the directory exceeds the data holding period will be described with reference to a flowchart shown in FIG. 6. Note that loop processing of S301 to S309 in the flowchart of FIG. 6 is performed for each directory. Loop processing of S304 to S308 is performed for each piece of order data stored in the directory. Furthermore, processing according to the flowchart of FIG. 6 is executed, for example, in a thread different from that of the processing according to the flowcharts of FIGS. 3A and 3B.

In S301, an unselected directory is set as a selected directory. In S302, the data holding period of the selected directory is acquired. In S303, it is determined whether the acquired data holding period is "indefinite". If the acquired holding period is "indefinite", that is, no data holding period has been set, the process advances to S309 to perform the processing in S301 and the subsequent processes. On the other hand, if the acquired holding period is not "indefinite", that is, the data holding period has been set, the process advances to S304. In S304, unselected order data among the order data stored in the selected directory is selected as a selected order data. In S305, the storage date/time of the selected order data is acquired. The storage date/time of data in the directory is managed by an OS (Operating System) or the like, and the managed storage date/time is acquired. A method of acquiring the storage date/time of data is not limited to this. In S306, it is determined whether the elapsed time after the acquired storage date/time exceeds the data holding period of the selected directory. If it is determined that the elapsed time exceeds the data holding period, the process advances to S307. On the other hand, if the elapsed time does not exceed the data holding period, the process advances to S308 to perform the processing in S304 and the subsequent processes. In S307, the selected order data is deleted.

Figure 7:
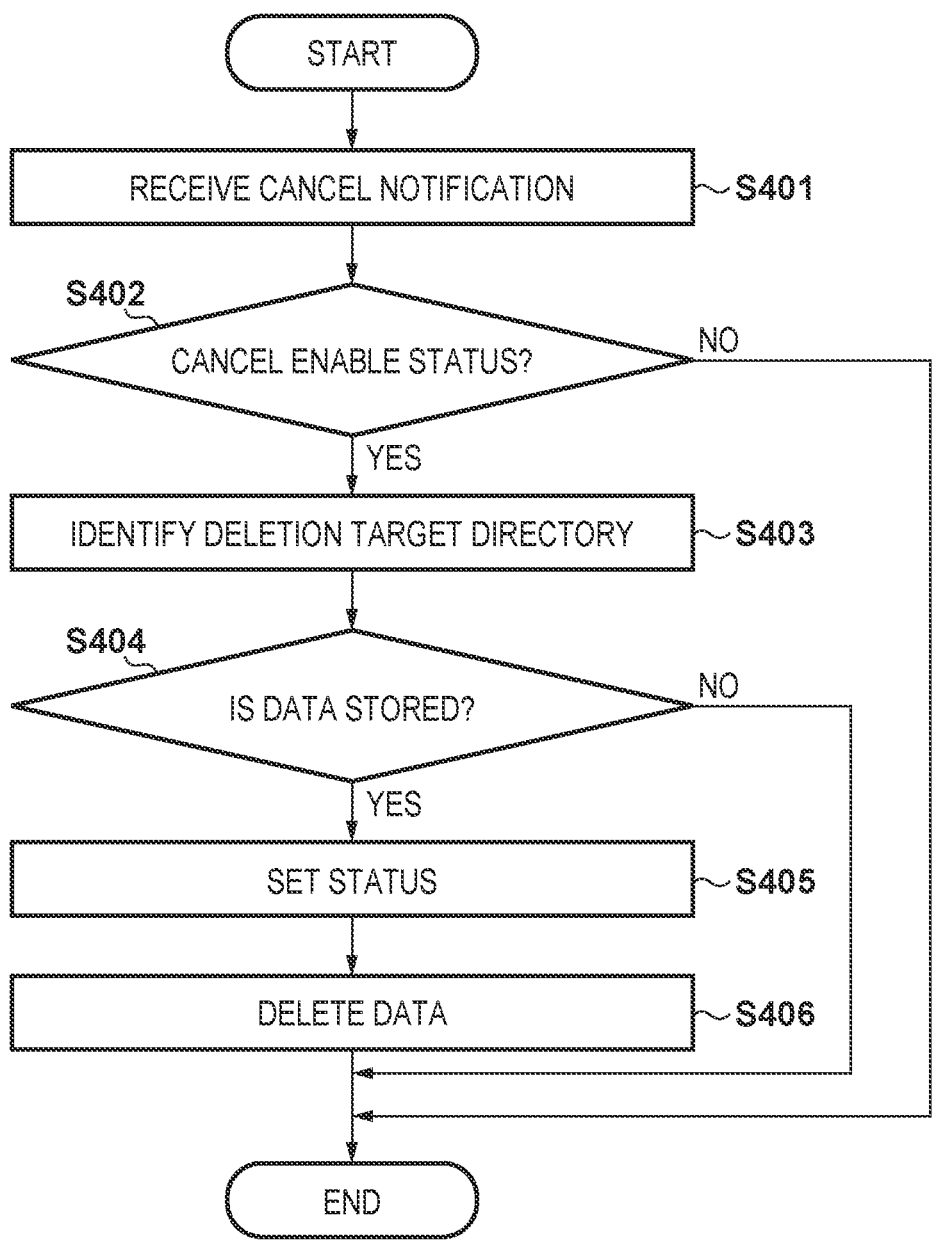
FIG. 7 is a flowchart illustrating processing executed when an order cancel instruction is received.

Processing executed by the management system 40 when an order cancel instruction is received will be described next with reference to a flowchart shown in FIG. 7. The processing according to the flowchart of FIG. 7 is executed when order data is uploaded from the user terminal to the management system 40, and then the user transmits, to the management system 40, an instruction to cancel the order of the photo book based on the order data by operating the user terminal. Assume that no payment is made before a predetermined time elapses after the upload (for example, no settlement instruction is sent from the user terminal, or settlement processing fails for some reason although a settlement instruction is sent). In this case, the EC site cooperative unit 412 transmits, to the management system 40, an instruction to cancel the order of the photo book based on the order data. Thus, the flowchart of FIG. 7 can be executed in this case.

In S401, the editing/order application cooperative unit 411 or the EC site cooperative unit 412 accepts the cancel instruction (cancel notification). In S402, upon receiving the cancel instruction, the function unit (editing/order application cooperative unit 411 or EC site cooperative unit 412) acquires the status of the order data as the target of the accepted cancel instruction. The function unit determines whether the acquired status is a cancel enable status. For example, for the order data in which a status indicating that cancellation has already been performed, a status indicating that a payment is overdue, a manufacturing disable status, or the like has been set, a cancel disable status is determined. For example, the management system 40 appropriately sets a status such as the status indicating that cancellation has already been performed, the status indicating that a payment is overdue, and the manufacturing disable status, when a corresponding situation occurs. For order data with other statuses, a cancel enable status is determined. As described above, the status of order data which can or cannot be canceled is not limited to a specific case. For example, the user of the management system 40 may appropriately set the status.

If it is determined in S402 that the acquired status is a cancel enable status, the process advances to S403; otherwise, the processing according to the flowchart of FIG. 6 is completed. In S403, upon receiving the cancel instruction, the function unit identifies the directory in which the order data is stored, based on the status of the order data as the target of the accepted cancel instruction and the type of the cancel instruction. For example, if the type of the cancel instruction indicates cancellation because of the overdue payment, the cancel instruction is that for order data before settlement processing is completed, and thus the order data is stored in the upload directory or the order completion directory. If the status of the order data as a cancel target is ST1, it is possible to identify that the order data is stored in the upload directory 421. If the status is ST2, it is possible to identify that the order data is stored in the order completion directory 422.

The cancel instruction from the user terminal can cancel order data in any status. It is thus impossible to identify the storage destination directory based on the type of the cancel instruction. Consequently, all of the upload directory 421, the order completion directory 422, the download directory 423, and the shipment completion directory 424 are identified as targets in S404.

Note that processing for identifying the directory in which the order data as the target of the cancel instruction is stored is not limited to this. For example, if it is possible to uniquely identify order data by a cancel instruction, the order data as the target of the cancel instruction may be identified using the cancel instruction.

In S404, upon receiving the cancel instruction, the function unit determines whether the order data as the target of the cancel instruction is stored in the directory identified in S403. Processes in S405 and S406 are performed for the directory storing the order data, and none of the processes in S405 and S406 are performed for the directory which does not store the order data. In S405, the status of the order data as a cancel target is set to "canceled". In S406, the order data as the target of the cancel instruction is deleted from the directory identified in S404.

The order data is deleted by the processes in S405 and S406 but information indicating the status "canceled" is stored in, for example, the directory associated with the order ID. Therefore, for example, the device which can access the directory can confirm the order ID corresponding to the canceled order as a cancel history. Note that the information indicating the status "canceled" may be set in the directory identified in S403. Furthermore, a "cancel directory" which is not shown in FIG. 1 may be provided, and the information indicating the status "canceled" may be saved in the cancel directory. A device which can access the cancel directory may be appropriately set. For example, if the user terminal is set as a device which can access the cancel directory, the user can refer to the canceled order history using the editing/order application 10. In addition, when setting the status "canceled", a different status may be set in accordance with a status before cancellation. With this processing, for example, when the user terminal refers to the cancel history, it can confirm a step in which the order is canceled.

As described above, in this embodiment, upon receiving, as order data, photo book data from an external device for generating the data, the order data are stored in a directory A in a photo book unit. Upon receiving, from an external device for performing settlement processing, information indicating completion of settlement for the order data stored in the directory A, the order data are stored in a directory B in an order unit. Upon receiving, from the external device for performing the settlement processing, information indicating completion of acceptance of orders for the order data stored in the directory B, the order data are stored in a directory C in a unit of a merchant that performs binding and shipment of a photo book. Upon receiving, from the external device of the merchant, information indicating completion of settlement of the order data stored in the directory C, the order data are stored in a directory D in the merchant unit.

An example of the hardware arrangement of a computer device which is applicable to the management system 40, the user terminal, the EC site 20, and the laboratory (a computer device except for a device such as a binding device for performing actual binding processing) will be described with reference to a block diagram shown in FIG. 10.

A CPU 201 executes processing using computer programs and data stored in a ROM 202 and a RAM 203. The CPU 201 controls the overall operation of the computer device, and also executes each process explained as a process to be executed by each device shown in FIG. 1 to which the computer device is applied. The CPU 201 corresponds to, for example, the above-described control unit 41.

The ROM 202 stores setting data (BIOS (Basic Input/Output System)), a boot program, and the like which need not be rewritten.

The RAM 203 includes an area for storing computer programs and data loaded from the ROM 202, a storage device 204, and an external memory 213, and an instruction input from a keyboard 210. The RAM 203 includes an area for storing the computer programs and data externally received via a communication I/F controller 209, and a work area used by the CPU 201 to execute various kinds of processes. As described above, the RAM 203 can appropriately provide various kinds of areas.

The storage device 204 is a mass information storage device represented by a hard disk drive device. The storage device 204 saves the computer programs and data for causing the CPU 201 to execute each process described as a process executed by the OS or each device shown in FIG. 1 to which the computer device is applied. If the computer device is applied to the management system 40, the computer programs include a computer program for causing the CPU 201 to execute the function of the control unit 41. If the computer device is applied to the user terminal, the computer programs include the editing/order application 10. If the computer device is applied to the laboratory (a computer device except for a device such as a binding device for performing actual binding processing), the computer programs include the laboratory management application 30. The data also include those explained above as known information. The various kinds of information described as those saved in the storage device 204 are appropriately loaded to the RAM 203 under the control of the CPU 201 and processed by the CPU 201.

An input controller 205 controls the operation of the keyboard 210. The keyboard 210 is an example of a user interface which can input various instructions to the CPU 201 when operated by the user.

An audio input controller 206 controls the operation of a microphone 211. The microphone 211 is an example of a user interface for inputting an audio to the computer device. Note that an audio output device such as a loudspeaker may be added to the arrangement of the computer device.

A video controller 207 controls the operation of a display 212. The display 212 is formed from a CRT or a liquid crystal screen, and displays the processing result of the CPU 201 as images and characters. Note that instead of or in addition to the display 212, a projection device such as a projector for projecting images and characters may be added to the arrangement of the computer device. Instead of the keyboard 210 and the display 212, a touch panel may be adopted.

A memory controller 208 controls processing of reading/writing information from/in the external memory 213. The external memory 213 is an external memory device, and is, for example, a hard disk drive device or a USB memory. The external memory 213 is a flexible disk (FD), a compact Flash® connected to a PCMCIA card slot via an adapter, or the like.

Note that the various kinds of information described as those held in each device shown in FIG. 1 are stored in the RAM 203, the storage device 204, the external memory 213, and the like. For example, these storage devices can be used as the file server 42 shown in FIG. 1.

The communication I/F controller 209 controls data communication with an external device via a network such as a LAN or the Internet connected to the network I/F 214, and can perform, for example, communication using TCP/IP.

All of the CPU 201, the ROM 202, the RAM 203, the storage device 204, the input controller 205, the audio input controller 206, the video controller 207, the memory controller 208, and the communication I/F controller 209 are connected to a system bus 200.

Figure 10:
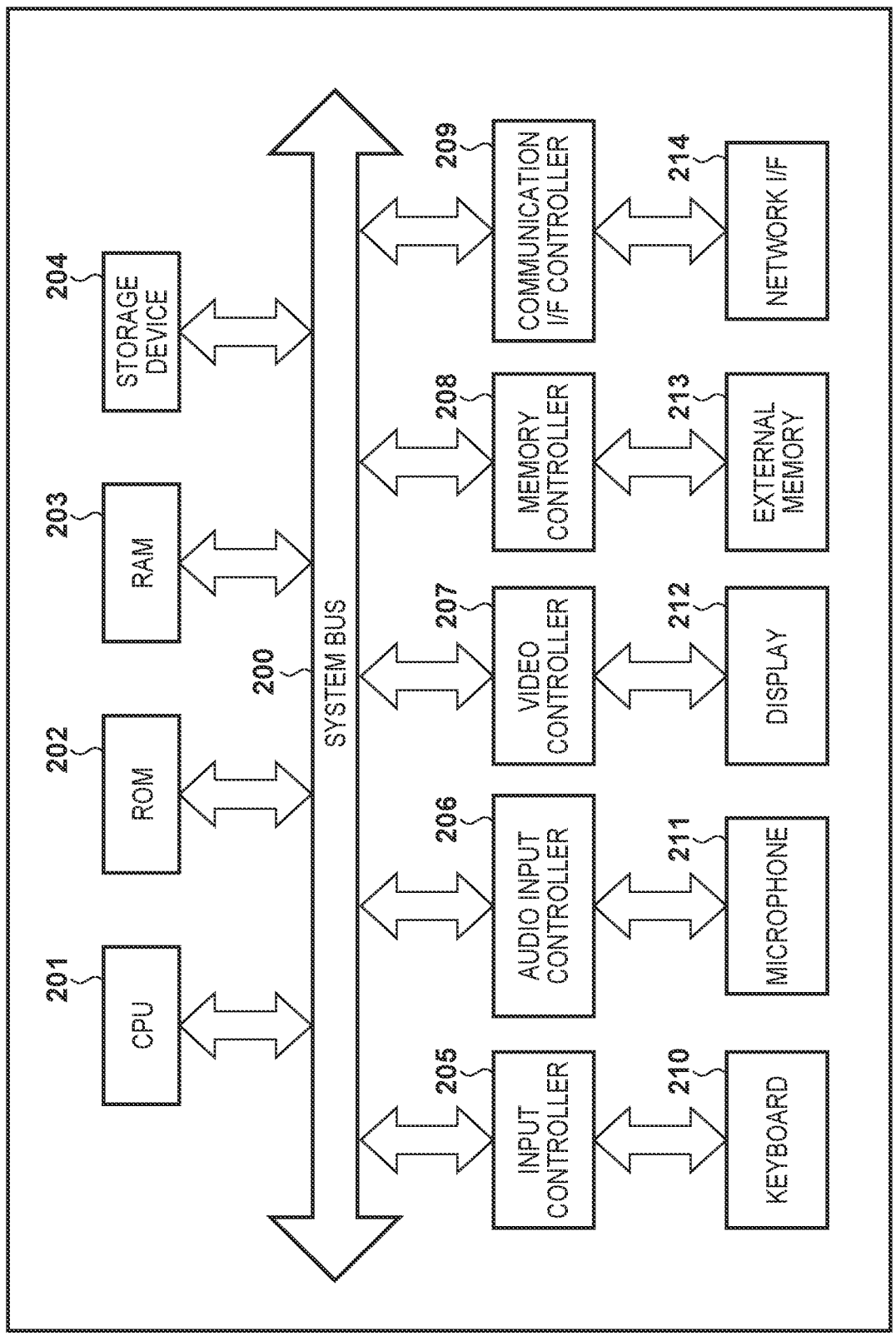
FIG. 10 is a block diagram showing an example of the hardware arrangement of a computer device.

Note that each device shown in FIG. 1 need not include all the components shown in FIG. 10. Some components may be deleted, as needed, and new components may be added. The respective devices shown in FIG. 1 may have the same arrangement or different arrangements.

Second Embodiment

The first embodiment has explained the system for generating a photo book. However, this system is an example of an arrangement in which upon completion of the first step in a series of processing while data used in the series of processing is stored in the first directory in a first unit, the data is stored in the second directory different from the first directory in a second unit corresponding to the second step as the next step of the first step (storage control). Other embodiments are plausible as long as they are based on such arrangement.

For example, as a document approval system, a system in which approval processing is completed by advancing approval by a section manager, a department manager, and a general manager is plausible. If document approval is applied, a document is stored in a directory accessible by the section manager, and is managed in a status "waiting for approval by section manager". If the section manager performs approval processing, the document is stored in a directory accessible by the department manager, and is managed in a status "waiting for approval by department manager". If the section manager performs approval processing, the document is stored in a directory accessible by the general manager, and is managed in a status "waiting for approval by general manager". As described above, any system in which a plurality of systems or people access data to sequentially perform processes may be adopted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012850, filed Jan. 26, 2016, which is hereby incorporated by reference herein in its entirety.

What is claimed is:

1. An information processing system comprising:
at least one processor,
wherein the at least one processor executes stored instructions to perform,
receiving first data of a first photo book from an external device and receiving second data of a second photo book from the external device,
storing the received first data in a first directory at a first date and time and storing the received second data in the first directory at a second date and time,
receiving first identifying information for identifying the first photo book and the second photo book as one or more photo books related to an order,
storing, in a case where the first data and the second data are contained in the first directory when the first identifying information is received, both of the first data and the second data in a second directory separately from other data corresponding to another order in the second directory,
deleting the first data from the first directory when an elapsed time after the first date and time exceeds a predetermined threshold, and independently deleting the second data from the first directory when an elapsed time after the second date and time exceeds the predetermined threshold,
storing, in a case where second identifying information is received that identifies different printing destinations for each of the first data and the second data, the first data and the second data separately from each other, in a third directory, and
deleting, from the second directory, both of the first data and the second data, based on that the first data and the second data are stored in the third directory, irrespective of the elapsed time after the first date and time and the elapsed time after the second date and time.

2. The system according to claim 1, wherein the third directory is accessible by the information processing system and a device being the destination.

3. The system according to claim 1, wherein in the deleting from the second directory, the first data and the second data are deleted based on that the first data and the second data are stored in the third directory, irrespective of the date and time of storing the first data and the second data in the second directory.

4. The system according to claim 1, wherein the first identifying information and the second identifying information are received from a system which executes settlement processing for an order of a photo book.

5. The system according to claim 1, wherein the first identifying information corresponding to an order is received upon completion of settlement for the order corresponding to data stored in the first directory.

6. The system according to claim 1, wherein the destination corresponds to an external device of a merchant that performs binding and shipment of a photo book.

7. The system according to claim 6, wherein the at least one processor further executes,
upon receiving, from the external device of the merchant, information indicating completion of shipment for the first photo book and the second photo book, storing the first data and the second data in a fourth directory in the merchant unit.

8. The system according to claim 6, wherein the at least one processor further executes the stored instructions to perform,
upon receiving, from an external device, information indicating completion of shipment for the first photo book and the second photo book, deleting the first data and the second data from the third directory.

9. The system according to claim 1, wherein the system is formed by a single device or a plurality of devices.

10. The system according to claim 1, wherein the system includes a server system which stores the first data and the second data in the first directory, the second directory, and the third directory, and a device which corresponds to the destination and acquires the first data and the second data from the third directory.

11. An information processing method, executed by at least one processor, comprising:
receiving first data of a first photo book from an external device and receiving second data of a second photo book from the external device;

storing the received first data in a first directory at a first date and time and storing the received second data in the first directory at a second date and time;

receiving first identifying information for identifying the first photo book and the second photo book as one or more photo books related to an order;

storing, in a case where the first data and the second data are contained in the first directory when the first identifying information is received, both of the first data and the second data in a second directory separately from other data corresponding to another order in the second directory;

deleting the first data from the first directory when an elapsed time after the first date and time exceeds a predetermined threshold, and independently deleting the second data from the first directory when an elapsed time after the second date and time exceeds the predetermined threshold;

storing, in a case where second identifying information is received that identifies different printing destinations for each of the first data and the second data, the first data and the second data separately from each other, in a third directory; and deleting, from the second directory, both of the first data and the second data, based on that the first data and the second data are stored in the third directory, irrespective of the elapsed time after the first date and time and the elapsed time after the second date and time.

12. The method according to claim 11, wherein the third directory is accessible by an information processing system which executes the information processing method and a device being the destination.

13. The method according to claim 11, wherein in the deleting from the second directory, the first data and the second data are deleted based on that the first data and the second data are stored in the third directory, irrespective of the date and time of storing the first data and the second data in the second directory.

14. The method according to claim 11, wherein the first identifying information and the second identifying information are received from a system which executes settlement processing for an order of a photo book.

15. The method according to claim 11, wherein the first identifying information corresponding to an order is received upon completion of settlement for the order corresponding to data stored in the first directory.

16. The method according to claim 11, wherein the destination corresponds to an external device of a merchant that performs binding and shipment of a photo book.

17. The method according to claim 14, wherein upon receiving, from the external device of the merchant, information indicating completion of shipment for the first photo book and the second photo book, storing the first data and the second data in a fourth director in a-merchant unit.

18. The method according to claim 11, wherein the method is executed by a single device or a plurality of devices.

19. The method according to claim 11, further comprising, acquiring the first data and the second data from the third directory, by a device which corresponds to the destination and is different from a server system storing the first data and the second data in the first directory, the second directory, and the third directory.

20. A non-transitory computer readable storage medium storing a computer program for causing a computer to execute an information processing method, the information processing method comprising:

receiving first data of a first photo book from an external device and receiving second data of a second photo book from the external device;

storing the received first data in a first directory at a first date and time and storing the received second data in the first directory at a second date and time;

receiving first identifying information for identifying the first photo book and the second photo book as one or more photo books related to an order;

storing, in a case where the first data and the second data are contained in the first directory when the first identifying information is received, both of the first data and the second data in a second directory separately from other data corresponding to another order in the second directory;

deleting the first data from the first directory when an elapsed time after the first date and time exceeds a predetermined threshold, and independently deleting the second data from the first directory when an elapsed time after the second date and time exceeds the predetermined threshold;

storing, in a case where second identifying information is received that identifies different printing destinations for each of the first data and the second data, the first data and the second data separately from each other, in a third directory; and deleting, from the second directory, both of the first data and the second data, based on that the first data and the second data are stored in the third directory, irrespective of the elapsed time after the first date and time and the elapsed time after the second date and time.

* * * * *